US010861297B2

(12) United States Patent
Jones

(10) Patent No.: US 10,861,297 B2
(45) Date of Patent: Dec. 8, 2020

(54) WEARABLE SAFETY LIGHTING SYSTEM

(71) Applicant: Mark W. Jones, East Lansing, MI (US)

(72) Inventor: Mark W. Jones, East Lansing, MI (US)

( * ) Notice: Subject to any disclaimer, the term of this patent is extended or adjusted under 35 U.S.C. 154(b) by 0 days.

(21) Appl. No.: 16/447,368

(22) Filed: Jun. 20, 2019

(65) Prior Publication Data

US 2020/0005605 A1 Jan. 2, 2020

Related U.S. Application Data

(60) Provisional application No. 62/690,375, filed on Jun. 27, 2018.

(51) Int. Cl.
*B60Q 1/26* (2006.01)
*G08B 5/38* (2006.01)
(Continued)

(52) U.S. Cl.
CPC ............ *G08B 5/38* (2013.01); *F21V 33/0008* (2013.01); *F21W 2111/10* (2013.01); *F21Y 2115/10* (2016.08)

(58) Field of Classification Search
CPC .............. F21Y 2115/10; G05B 19/048; G05B 2219/24015; G05B 2219/49141; G05B 9/02; G05B 15/02; B60Q 1/0094; B60Q 1/2673; B60Q 1/2676; B60Q 1/445; B60Q 2900/30; B62J 27/00; B62J 6/00; B62J 6/04; F21V 33/0008; F21V 21/15; F21V 21/38; F21V 23/02; F21V 23/0442; F21V 23/045; F21V 29/74; G01C 21/26; G01C 21/3697; G01S 19/34; G02B 2027/0138; G02B 2027/014; G02B 2027/0178; G02B 2027/0187; G02B 27/0093; G02B 27/017; G02B 27/0172; G02B 27/0179; G06F 1/163; G06F 1/3206; G06F 1/325; G06F 3/013; G06F 3/017; G08B 5/38; G08B 21/182; G08B 5/36; H04N 13/366; H04N 13/383; H04N 5/76; H04N 7/18; H04N 7/181; H04W 52/0274; Y02D 70/00;
(Continued)

(56) References Cited

U.S. PATENT DOCUMENTS 4,328,533 A 5/1982 Paredes
5,690,411 A * 11/1997 Jackman ................ A41D 13/01 362/103

(Continued)

*Primary Examiner* — Daniel Previl
(74) *Attorney, Agent, or Firm* — Gardner, Linn, Burkhart & Ondersma LLP

(57) ABSTRACT

A wearable lighting system includes a first wireless communications device such as a transmitter disposed within a vehicle, a light-emitting device worn by a user, and a second wireless communications device such as a sensor. The sensor is worn by the user and is in wireless communication with the transmitter. The sensor is adapted to activate the light-emitting device when the sensor is greater than a threshold distance from the transmitter and adapted to deactivate the light-emitting device when the sensor is a less than or equal to the threshold distance from the transmitter, thereby causing the light-emitting device to automatically activate upon the user exiting the vehicle and automatically deactivate when the user returns to the vehicle.

20 Claims, 3 Drawing Sheets

(51) Int. Cl.
*F21V 33/00* (2006.01)
*F21W 111/10* (2006.01)
*F21Y 115/10* (2016.01)

(58) Field of Classification Search
CPC ........... Y02D 70/1224; Y02D 70/1242; Y02D 70/1262; Y02D 70/142; Y02D 70/144; Y02D 70/146; Y02D 70/162; Y02D 70/164; Y02D 70/22; Y02D 70/26; A01G 9/20; A01G 9/249; A61B 2562/0219; A61B 5/0077; A61B 5/01; A61B 5/02; A61B 5/02007; A61B 5/02055; A61B 5/024; A61B 5/0531; A61B 5/0816; A61B 5/1101; A61B 5/14532; A61B 5/163; A61B 5/18; A61B 5/6802; A61B 5/6893; A61B 5/7275; A61B 5/74; A61B 5/7405; A61B 5/742; A61B 5/7455; A61B 5/746; B60W 2540/26; B60W 40/08; B60W 50/0097; B66D 1/12; F21L 4/00; F21S 8/061; F21W 2111/10; G06Q 10/00; G06Q 50/165; G06Q 50/265; G16H 40/63; G16H 50/20; G16H 50/30; G16H 50/70

USPC ....... 340/468, 432, 464, 467, 471, 479, 463, 340/466, 472, 440, 689, 903

See application file for complete search history.

(56) References Cited

U.S. PATENT DOCUMENTS 6,411,204 B1 * 6/2002 Bloomfield ............ B60Q 1/302 340/464
6,461,015 B1 10/2002 Welch
8,301,237 B2 * 10/2012 Lanfermann ........ A61B 5/0488 600/546
8,629,766 B2 * 1/2014 Lee ......................... G09F 21/02 340/432
8,917,187 B2 12/2014 Matte
9,092,956 B2 7/2015 Secord et al.
2005/0162265 A1 * 7/2005 Werner ................ B60Q 1/2676 340/468
2008/0117642 A1 * 5/2008 Moizard ................ B60Q 1/085 362/466
2011/0046826 A1 * 2/2011 Carroll ................ B61L 15/0027 701/19
2014/0055986 A1 2/2014 Corpus, Jr. et al.

* cited by examiner

WEARABLE SAFETY LIGHTING SYSTEM

CROSS REFERENCE TO RELATED APPLICATIONS

This application claims the filing benefits of U.S. provisional application, Ser. No. 62/690,375, filed Jun. 27, 2018, which is hereby incorporated herein by reference in its entirety.

FIELD OF THE INVENTION

The present invention relates to wearable safety devices and, more particularly, to wearable light-emitting safety devices.

BACKGROUND OF THE INVENTION

A common cause of law enforcement officer injury and mortality is automobile accident related. Often, officers are struck by vehicles while they are out of their own vehicle. Typically, these accidents occur during highway traffic stops, as it can be difficult to see officers on the side of the road. It is especially difficult to see officers when they leave their vehicles at night time. Bright flashing warning lights are effective in attracting the attention of other drivers in these settings.

SUMMARY OF THE INVENTION

The present invention provides a wearable lighting system that can be worn by a user, such as a law enforcement officer or first responder, when outside his or her vehicle to provide a flashing, bright, warning light. The wearable lighting system includes a first wireless communications device such as a transmitter within a vehicle, a second wireless communications device such as sensor, and a light-emitting device. The light-emitting device may be adapted to be worn on the back of the user or other convenient locations. The sensor is also worn by the user and adapted to be in wireless communication with the transmitter. The sensor activates the light-emitting device when the sensor is further than a threshold distance from the transmitter. The sensor deactivates the light-emitting device when the sensor is closer than or equal to a threshold distance from the transmitter. The system may also include a switch that allows for the user to manually control the light-emitting device. The switch may be adapted to be worn on the shoulder of the user or in substantially any other convenient location on the user's body or clothing. The light-emitting device may flash when activated and may include at least one light-emitting diode. The sensor and transmitter may communicate via electromagnetic fields or, more specifically, radio waves.

In one form of the present invention, a method for selectively activating a light-emitting device of a wearable lighting system includes determining a distance between a sensor of the wearable lighting system and a transmitter disposed within a vehicle. The sensor and light-emitting device are worn by a user. The method further includes activating the light-emitting device if the determined distance is greater than a distance threshold. The method also includes deactivating the light-emitting device if the determined distance is less than the distance threshold.

In an aspect of the present invention, the distance threshold is reached when the sensor does not receive or detect a signal from the transmitter. Alternatively, the distance threshold is reached when a received signal's signal strength is below a threshold.

In another aspect of the present invention, the wearable lighting system may further include an actuation switch. The sensor may be further adapted to deactivate the light emitting device by outputting an actuation signal to the actuation switch. Deactivating the light emitting device disconnects a power supply from the light emitting device.

Thus, the wearable lighting system of the present invention provides a convenient and cost-effective means for improving the safety of those outside of their vehicle and still near traffic. The wearable lighting system automatically activates and deactivates a light-emitting device based on the proximity of the user to his or her vehicle and increases the visibility of the user without active intervention. Optionally, a manual switch may be used to manually turn the light-emitting device on or off.

In another form of the present invention, a wearable lighting system includes a transmitter adapted to be disposed within a vehicle and a wearable portion adapted to be worn by a user. The wearable portion includes a light-emitting device and a sensor in wireless communication with the transmitter. The wearable lighting system further includes a manual switch electrically coupled to the light-emitting device and adapted to selectively activate and deactivate the light-emitting device when the manual switch is actuated. The sensor is adapted to activate the light-emitting device when the sensor detects a distance greater than a threshold distance between the sensor and the transmitter. The sensor is adapted to deactivate the light emitting device when the sensor detects a distance less than or equal to the threshold distance between the sensor and transmitter. The actuation of the manual switch will supersede the sensor from activating and deactivating the light-emitting device.

These and other objects, advantages, purposes, and features of the present invention will become apparent upon review of the following specification in conjunction with the drawings.

DESCRIPTION OF THE PREFERRED EMBODIMENTS

Figure 1:
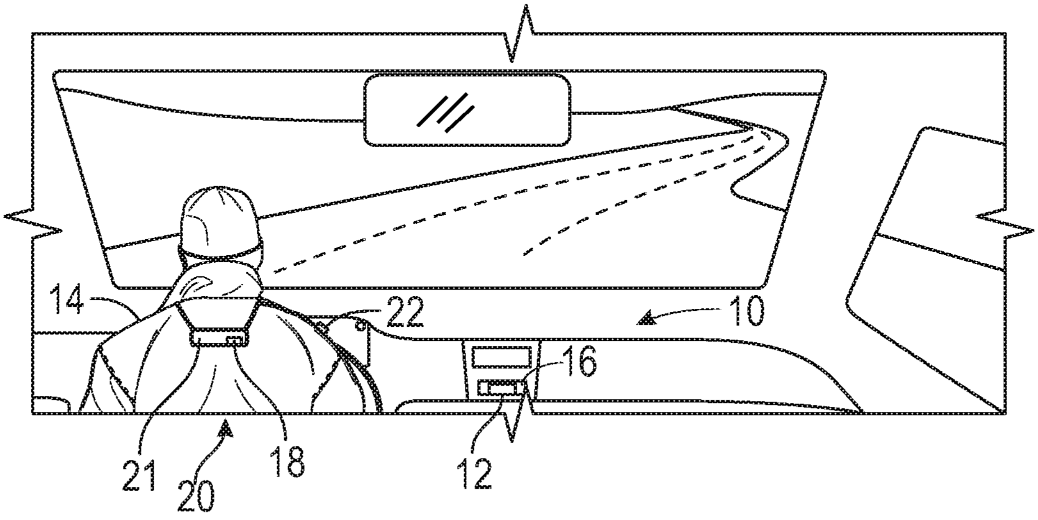
FIG. 1 is an interior view of a vehicle containing a wearable lighting system in accordance with the present invention.

Referring now to the drawings and the illustrative embodiments depicted therein, a wearable lighting system 10 provides a wearable portion 20, which includes a bright light source or light-emitting device 21, to be worn by a user 14, such as law enforcement and/or first responders, when outside of his or her vehicle. Other users 14 are also anticipated, such as those traveling in roadside maintenance or similar service vehicles, which may make frequent stops and see the user 14 exit the vehicle. The light source 21 is automatically activated when the user 14 leaves the vehicle and is deactivated when the user 14 enters (or remains in) the vehicle. To accomplish this, the system 10 includes a first wireless communicator such as a transmitter 12 disposed within the vehicle and a second wireless communicator such as a sensor 18 worn by the user 14 (and part of the wearable portion 20). As it is light weight and compact, the wearable portion 20 (comprising the sensor 18 and associated light source 21) may be easily worn in many convenient locations on the user 14. The light source 21 therefore automatically enhances visibility of the user 14 when outside the vehicle, as will be described in more detail below.

Figure 2:
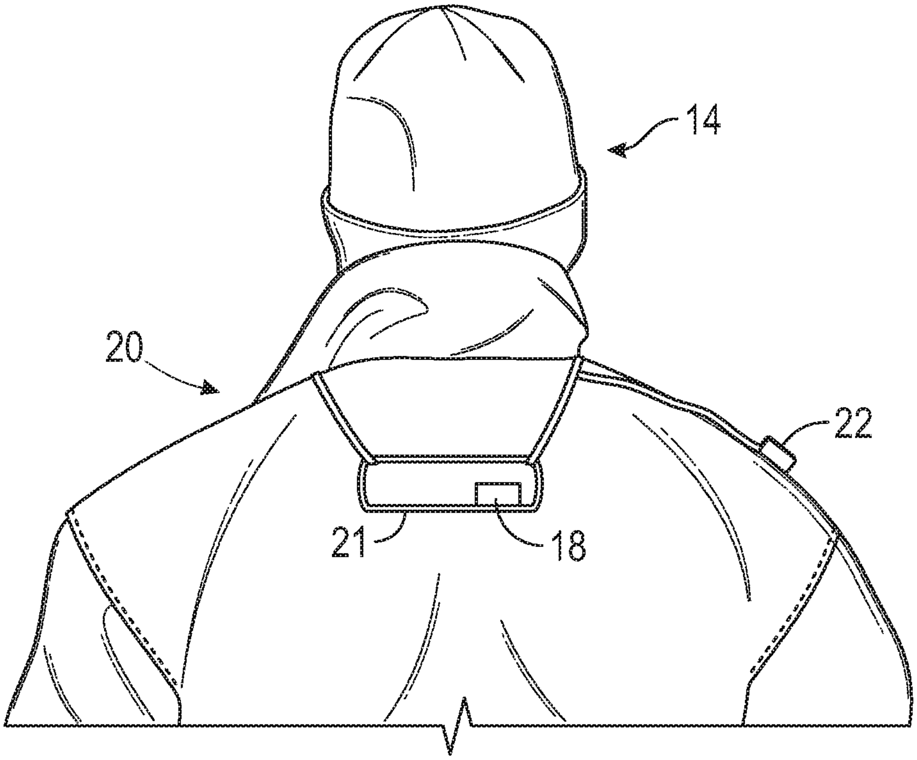
FIG. 2 is a perspective view of a user wearing a wearable portion of the wearable lighting system as shown in FIG. 1.

As shown in FIG. 1, the transmitter 12 of the lighting system 10 is adapted to be disposed within the vehicle. The transmitter 12 may be disposed anywhere that is convenient to a user 14, such as a console 16, glove box, or other receptacle, or may be permanently or semi-permanently installed in the vehicle, such as inside a seat, door structure, headliner, or other vehicle structure. The light source 21 is adapted to shine visible light around the user 14. It will be appreciated this may be accomplished in a number of ways. For example, multiple light sources (of the light-emitting device 21) may be disposed at different angles and locations around the user to increase the viewable range. Alternatively, a reflective surface or material such as a mirror or prism may be used to redirect the light at different angles. The light source 21 may include at least one light-emitting diode (LED), but other types of light sources are also contemplated, such as incandescent, fluorescent, stroboscopic, and the like. The wearable portion 20 may be adapted to be worn on the user's 14 back (thereby placing the light source 21 on the user's back), such as shown in FIGS. 1 and 2, thereby drawing attention to the user 14 without affecting the user's night vision or otherwise adversely affecting his or her ability to see. Further, the light source 21 may flash when activated, allowing for additional visibility of the user 14. Alternatively, the light source 21 may emit light continuously. The light source 21 may emit visible light of any suitable color, such as white, red, blue, or it may emit multiple colors, such as is common with emergency vehicles.

As previously discussed, the sensor 18 is worn by the user 14 (as part of the wearable portion 20) and is in wireless communication with the transmitter 12. When the sensor 18 detects a distance greater than a threshold distance between the sensor 18 and the transmitter 12, the sensor 18 activates the light source 21. When the sensor 18 detects a distance less than or equal to the threshold distance, the sensor 18 deactivates the light source 21. If the light source 21 is already deactivated and the distance is still below the threshold distance, the light source 21 will remain deactivated. The threshold distance may be any distance supported by the sensor 18 and transmitter 12, and in most applications would preferably be a distance sufficient to be indicative that the user 14 is outside the vehicle. For example, this distance may be approximated as 2 meters.

The sensor 18 and transmitter 12 may use any wireless communication appropriate for the sensor 18 to determine the distance from the transmitter 12. For example, the transmitter 12 and the sensor 18 could use electromagnetic fields to communicate. More specifically, radio signals may be used, or substantially any other technology capable of wirelessly transmitting a signal or field, including RFID technology or even a permanent magnet. With radio signals, the strength of the signal determines a distance at which the sensor 18 can detect radio signals transmitted by the transmitter 12. The sensor 18 may be adapted to keep the light source 21 deactivated whenever the sensor 18 is successfully receiving a radio signal from the transmitter 12. If the sensor 18 fails to receive a radio signal from the transmitter 12, the sensor 18 may activate the light source 21. Accordingly, adjusting the strength of the electromagnetic fields or radio signals emanating from transmitter 12 will adjust the threshold distance, and sensor 18 may be configured to activate the light source 21 once the detected field strength has fallen below the predetermined threshold distance. It is contemplated that the transmitter 12 may allow for the user 14 to adjust the threshold distance. For example, the user 14 might adjust a switch or other control on the transmitter 12 to increase or decrease the signal strength of the transmitted radio signal. While the term "transmitter" is used herein, it is to be understood that there may be two-way communication between the transmitter 12 and the sensor 18. For example, the sensor 18 may communicate status or other information to the transmitter 12.

As shown in the illustrated embodiment of FIGS. 1 and 2, the wearable lighting system 10 may also include a manual switch 22. The manual switch 22 may be a part of the wearable portion 20. The manual switch 22 may be electrically coupled to the light source 21 such that actuation of the manual switch 22 activates and deactivates the light source 21. Such actuation may supersede or override the sensor's ability to activate and deactivate the light source 21. This is to allow the user manual control over the light source 21 when a situation makes such control convenient or desirous, such as when the user wishes to activate the light source 21 at a distance closer than the threshold distance. The manual switch 22 may be worn by the user 14 at any convenient location. For example, the manual switch 22 may be worn on a shoulder of the user 14. It will be appreciated that any sort of switch may be used. For example, manual switch 22 may be a toggle switch, a push button switch, a selector switch, a joystick switch, or the like.

Figure 3A:
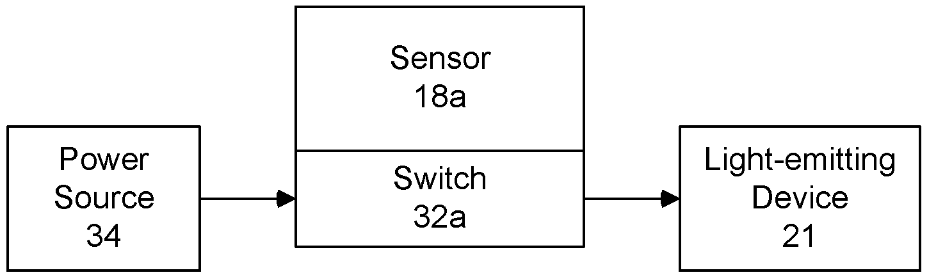
FIG. 3A is a block diagram of the wearable portion of the wearable lighting system as shown in FIG. 2.
Figure 3B:
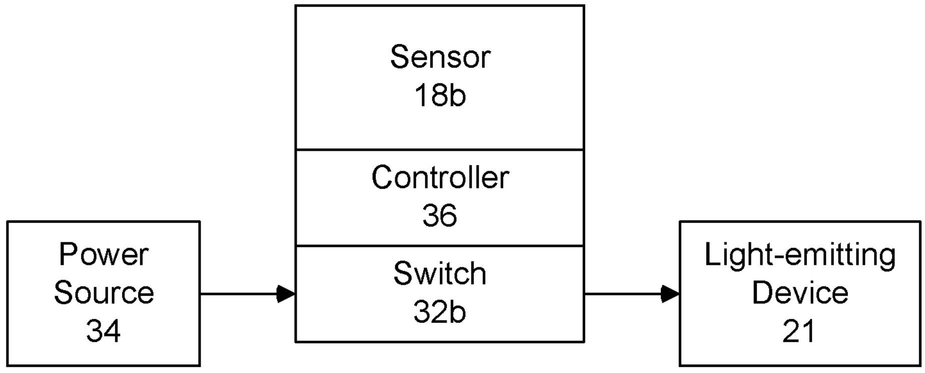
FIG. 3B is an alternative block diagram of the wearable portion of the wearing lighting system as shown in FIG. 2.

While sensor 18 is referred to as a sensor configured to determine if a detected field strength has fallen below a predetermined threshold distance, and to responsively activate or deactivate the light source 21, as illustrated in FIG. 3A, an exemplary sensor 18*a* may include or be associated with a switch 32*a* configured to open and close a circuit coupling the light source 21 to a battery or other similar power source 34. Thus, the sensor 18*a* is configured to cause the switch 32*a* to open or close in response to the sensor 18*a* detecting (i.e., receiving), or failing to detect, a radio signal from the transmitter 12, respectively. Alternatively, and as illustrated in FIG. 3B, another exemplary sensor 18*b* may include or be coupled to a controller 36 and another switch 32*b*. Such a controller 36 may be configured to respond when the sensor 18*b* detects the presence of (i.e., receives) a radio signal transmitted by the transmitter 12, and/or to decide whether a radio signal received by the sensor 18*b* is above or below a threshold signal level. That is, responsive to the sensor 18*b*, the controller 36 is configured to output a control signal to the switch 32*b* to open/close the circuit coupling the light source 21 to the battery or other similar power source 34.

Figure 4:
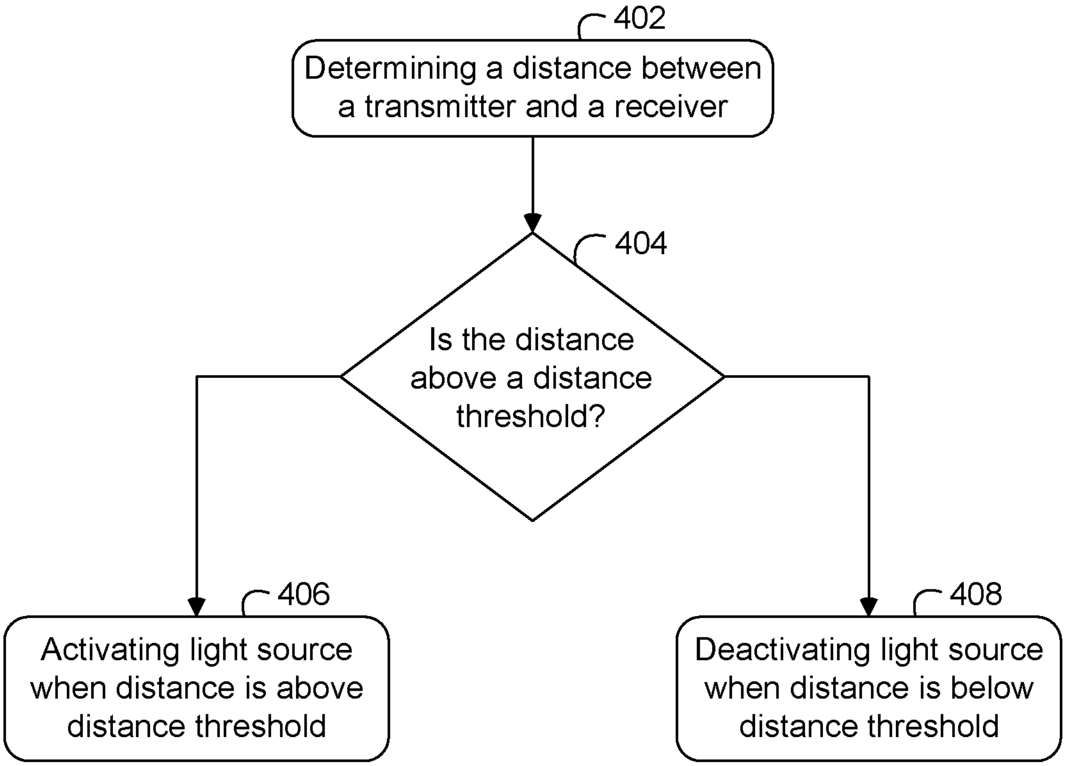
FIG. 4 is a flow diagram of the steps to a method for selective activation of a wearable lighting system in accordance with the present invention.

FIG. 4 is a flow diagram illustrating a method for selectively energizing the light source 21 of the wearable lighting system 10. In step 402 of FIG. 4, a distance is determined between the transmitter 12 and the sensor 18. Step 404 of FIG. 4 determines whether the distance is above (greater than) a distance threshold. As discussed herein, the distance threshold is reached when the sensor 18 does not receive or detect a signal from the transmitter 12. Alternatively, the distance threshold is reached when a received signal's signal strength is below (less than) a threshold. Both methods of step 404 provide an indication that the sensor 18 has moved at least a minimum distance from the transmitter 12 (e.g., that a user 14 wearing the light source 21 is outside a vehicle housing the transmitter 12). If the distance is below the distance threshold (e.g., below two meters and/or the user is still within the vehicle), the method proceeds to step 408 and the light source 21 is deactivated or remains deactivated. If the distance is above the distance threshold (e.g., above two meters), the method proceeds to step 406 and the light source 21 is activated or remains activated.

Accordingly, the wearable lighting system of the present invention provides a flashing, bright, automatically-activated warning light to be worn by a user when outside of his or her vehicle. It is lightweight and compact and may be worn in any convenient location. The light provides additional visibility, especially at night. It is activated automatically when the user leaves the vehicle and automatically deactivated when the user returns to the vehicle. This is accomplished via the transmitter located inside of the vehicle and the sensor worn by the vehicle. A manual switch to activate and deactivate the light may be used to manually control the light source. Institution of this device should make police officers, first responders, and other roadside workers more easily visible when they leave their vehicles, therefore lowering the risk of being hit by oncoming traffic.

Changes and modifications in the specifically-described embodiments may be carried out without departing from the principles of the present invention, which is intended to be limited only by the scope of the appended claims as interpreted according to the principles of patent law including the doctrine of equivalents.

The embodiments of the invention in which an exclusive property or privilege is claimed are defined as follows:

1. A wearable lighting system comprising:

a first wireless communicator adapted to be disposed within a vehicle;

a light-emitting device adapted to be worn by a user; and a second wireless communicator in wireless communication with said first wireless communicator and adapted to be worn by the user;

wherein said second wireless communicator is adapted to activate said light-emitting device when one of said first and second wireless communicators detects a distance greater than a threshold distance between said second wireless communicator and said first wireless communicator; and wherein said second wireless communicator is adapted to deactivate the light emitting device when one of said first and second wireless communicators detects a distance less than or equal to the threshold distance between said first and second wireless transmitters.

2. The wearable lighting system of claim 1, further comprising a manual switch electrically coupled to said light-emitting device and adapted to activate and deactivate said light-emitting device when said manual switch is actuated, wherein the actuation of said manual switch will supersede said second wireless communicator from activating and deactivating said light-emitting device.

3. The wearable lighting system of claim 2, wherein said switch is adapted to be worn on a shoulder of the user, and wherein said light-emitting device is adapted to be worn on the user's back.

4. The wearable lighting system of claim 2, wherein said light-emitting device flashes when activated by said sensor or said switch.

5. The wearable lighting system of claim 1, wherein said first and second wireless communicators communicate with electromagnetic fields.

6. The wearable lighting system of claim 5, wherein said first wireless communications device comprises a transmitter and said second wireless communications device comprises a sensor.

7. The wearable lighting system of claim 1, wherein the threshold distance is less than 2 meters.

8. The wearable lighting system of claim 1, wherein said light-emitting device comprises of at least one light-emitting diode.

9. The wearable lighting system of claim 1 further comprising a switch, wherein said second wireless communicator is adapted to activate and deactivate said light-emitting device by outputting at least one actuation signal to said switch, wherein deactivating said light-emitting device disconnects a power supply from said lighting-emitting device, and wherein activating said light-emitting device connects said power supply to said light-emitting device.

10. A method for selectively activating a light-emitting device of a wearable lighting system, said method comprising:

determining a distance between a first wireless communications device disposed within a vehicle and a second wireless communications device, wherein the second wireless communications device and the light-emitting device are worn by a user;

activating the light-emitting device with the second wireless communications device if the determined distance is above a distance threshold; and deactivating the light-emitting device with the second wireless communications device if the determined distance is below the distance threshold.

11. The method of claim 10, wherein the second wireless communications device is in wireless communication with the first wireless communications device.

12. The method of claim 10, wherein the sensor and transmitter communicate with electromagnetic fields.

13. The method of claim 12, wherein the first wireless communications device comprises a transmitter and the second wireless communications device comprises a sensor.

14. The method of claim 10, wherein the threshold distance is less than 2 meters.

15. The method of claim 10, wherein the distance threshold is reached when the second wireless communications device does not receive a signal from the first wireless communications device.

16. The method of claim 10, wherein the distance threshold is reached when a received signal's signal strength is below a threshold.

17. The method of claim 10 further comprising manually activating and deactivating the light-emitting device with a manual switch that is electrically coupled to the light-emitting device and is adapted to selectively activate and deactivate the light-emitting device, and wherein the actuation of the manual switch will supersede the sensor from activating and deactivating the light-emitting device.

18. The method of claim 17, wherein the manual switch is configured to be worn on a shoulder of the user.

19. The method of claim 10, wherein the light-emitting device is configured to be worn on the user's back.

20. A wearable lighting system comprising:

a transmitter adapted to be disposed within a vehicle;

a wearable portion adapted to be worn by a user, wherein said wearable portion comprises:

a light-emitting device;

a sensor in wireless communication with said transmitter; and a first switch adapted to selectively connect and disconnect a power supply from said light-emitting device; and a manual switch electrically coupled to said light-emitting device and adapted to selectively activate and deactivate said light-emitting device when said manual switch is actuated;

wherein said sensor is adapted to activate said light-emitting device when said sensor detects a distance greater than a threshold distance between said sensor and said transmitter, wherein said sensor is adapted to activate and deactivate said light-emitting device by outputting at least one actuation signal to the first switch, and wherein activating said light-emitting device connects the power supply to said light-emitting device;

wherein said sensor is adapted to deactivate said light emitting device when said sensor detects a distance less than or equal to the threshold distance between said sensor and said transmitter, and wherein deactivating said light-emitting device disconnects the power supply from said light-emitting device; and wherein said manual switch is actuatable to supersede said sensor from activating and deactivating said light-emitting device.

* * * * *